No. 850,355. PATENTED APR. 16, 1907.
E. H. DENTON.
FRUIT GATHERER.
APPLICATION FILED JAN. 20, 1906.
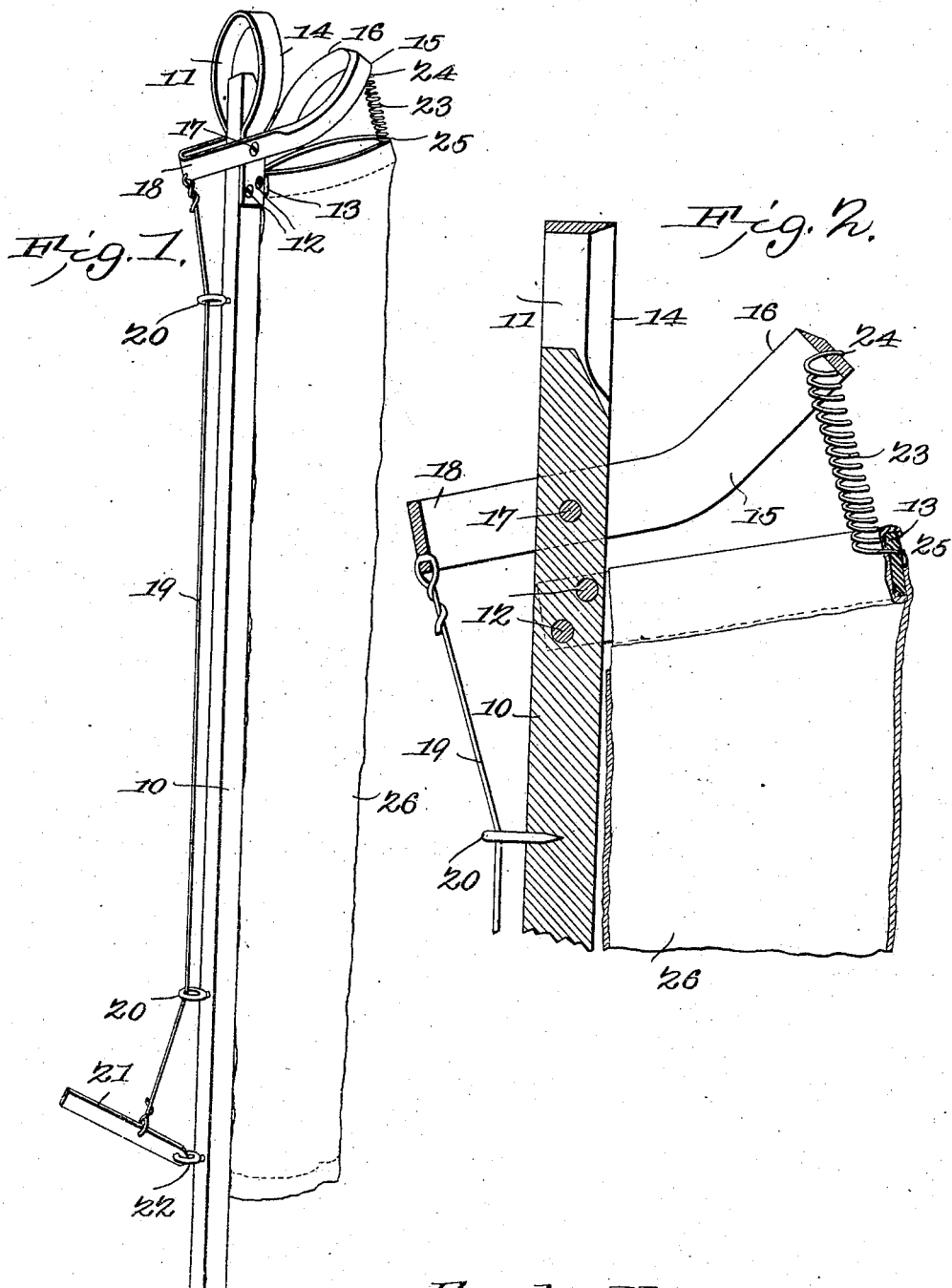
Witnesses
Erastus H. Denton,
Inventor.
by
Attorneys

UNITED STATES PATENT OFFICE.

ERASTUS H. DENTON, OF ATLANTA, GEORGIA.

FRUIT-GATHERER.

No. 850,355.   Specification of Letters Patent.   Patented April 16, 1907.

Application filed January 20, 1906. Serial No. 297,066.

*To all whom it may concern:*

Be it known that I, ERASTUS H. DENTON, a citizen of the United States, residing at 12 Nesbit street, Atlanta, in the county of Fulton and State of Georgia, have invented a new and useful Fruit-Gatherer, of which the following is a specification.

This invention relates to fruit-gatherers, and has for its object to provide a device of the class embodying new and improved features of utility, durability, and convenience.

A further object of the invention is to provide a device of the class capable of cutting the stem or limb upon which the fruit hangs, thereby preventing the damage to the fruit caused by pulling the stem out.

With these and other objects in view the present invention consists in the combination and arrangement of parts, as will be hereinafter fully described, shown in the accompanying drawings, and particularly pointed out in the appended claim, it being understood that changes in the form, proportion, size, and minor details may be made without departing from the spirit or sacrificing any of the advantages of this invention.

In the drawings, Figure 1 is a perspective view of the improved fruit-gatherer. Fig. 2 is a vertical sectional view of the fruit-gatherer.

Like characters of reference indicate corresponding parts in both figures of the drawings.

In its preferred embodiment the improved fruit-gatherer forming the subject-matter of this application comprises a handle 10, which may be of any approved length, upon the upper end of which is secured the bowed knife 11 in any approved manner, as by the bolts 12. Between the ends of the knife 11 and the handle 10 is clamped the bowed frame 13, through which the bolts 12 also pass, securing the frame rigidly to the handle and with its plane at a slight upward tilt. The knife 11 is provided with a cutting edge 14, to coöperate with which a bowed knife 15 with a cutting edge 16 is pivoted upon the handle, as by the bolt 17. To operate the pivoted knife 15, it is provided with a lever 18, extending from the handle opposite the knife, and a wire 19, secured thereto and running downward along the handle through loops 20 to a lever 21, is pivoted to the handle, as at 22.

To retract the knife, a spring 23 is secured to the middle of the bow of knife 15 at one end, as at 24, and at its other end to the middle of the bow of the brace 13, as at 25. To the frame 13 is secured the upper open end of a tubular chute 26, which extends downward along and nearby to the lower end of the handle 10, and composed, preferably, of fabric.

In operation the end of the handle carrying the knives is elevated into a fruit-tree and the fruit to be gathered embraced within the bows of knives 11 and 15. The lever 21 being moved about its pivot, the knife 15 is closed upon the stem or limb, and by pressing against cutting edge 14 the edge 16 clips the stem or limb. By reason of the upper beveled end of the handle the fruit is held over the upper open end of the chute and when clipped the spring 23 prevents it from being thrown out and guides it into the chute, down which it rolls and is caught at the lower end in any approved manner. By locating the spring 23 between the knife 15 and frame 13, as shown, it coöperates with the upper portion of the handle 10 to hold the fruit directly above the chute 26, rendering it impossible for the fruit to fall between the frame 13 and knife 16.

The knives 11 and 15 being arranged to clip the limb, it is obvious that the device may be used for clipping limbs not carrying fruit, thus pruning the tree.

It will be seen that the upper end of the handle 10 projects into the bowed knife 11 and is beveled. By disposing this end in the manner shown and described the fruit while being picked will be deflected by the beveled end of the handle into the bowed frame 13 and the chute carried thereby. Moreover, this beveled end of the handle prevents the fruit, if small, from falling through the loop 11 while being picked.

It is also to be noted that the beveled end of the handle does not extend entirely across the bowed knife 11, but instead a clear space is left thereabove and to each side of it for the reception of any small branches or twigs which it may be desired to cut off the tree. If this opening were not provided, it would be practically impossible to trim a tree by means of this tool, because it would be necessary to simultaneously cut each twig or branch in two places.

Having thus described the invention, what is claimed is—

In a fruit-picker the combination with a handle having a beveled end; of a strip bent into substantially circular form and arched over the beveled end of the handle, the ends of the strip being secured to the handle and said strip being sharpened to constitute a knife, a substantially circular frame secured to the handle, a chute suspended therefrom, a strip bent into the form of a circular knife and a U-shaped lever, said lever embracing the handle and the ends of the first-mentioned knife, and disposed at an angle to the plane occupied by the cutting edge of the knife of the lever, and the knife of said lever being interposed between the frame and the first-mentioned knife, a spring secured at its ends to the central portion of the frame and the knife of the lever, said spring and the handle coöperating to retain a fruit above the chute, and actuating means connected to the lever.

In testimony that I claim the foregoing as my own I have hereto affixed my signature in the presence of two witnesses.

ERASTUS H. DENTON.

Witnesses:
D. P. WOOD,
J. A. SIMS.